(12) United States Patent
Alexander

(10) Patent No.: US 7,339,492 B1
(45) Date of Patent: Mar. 4, 2008

(54) MULTI-MEDIA WIRELESS SYSTEM

(76) Inventor: Matthew David Alexander, 33637 State Highway 34, Detroit Lakes, MN (US) 56501

( * ) Notice: Subject to any disclaimer, the term of this patent is extended or adjusted under 35 U.S.C. 154(b) by 395 days.

(21) Appl. No.: 10/957,967

(22) Filed: Oct. 4, 2004

(51) Int. Cl.
*H04Q 1/00* (2006.01)

(52) U.S. Cl. .............................. 340/825.69; 340/825.25

(58) Field of Classification Search ........... 340/825.69, 340/825.72, 825.24, 825.25; 348/734; 725/74, 725/78, 81
See application file for complete search history.

(56) References Cited

U.S. PATENT DOCUMENTS

| | | | |
|---|---|---|---|
| 3,757,220 A | | 9/1973 | Abel |
| 4,885,803 A | * | 12/1989 | Hermann et al. ...... 340/825.72 |
| 5,204,768 A | * | 4/1993 | Tsakiris et al. ........ 340/825.72 |
| 5,307,055 A | * | 4/1994 | Baskin et al. ............... 348/734 |
| 5,307,193 A | * | 4/1994 | VanZeeland et al. ... 340/825.69 |
| 5,425,101 A | | 6/1995 | Woo et al. |
| 5,619,251 A | * | 4/1997 | Kuroiwa et al. ............ 348/734 |
| 5,793,980 A | | 8/1998 | Glasser et al. |
| 5,867,223 A | | 2/1999 | Schindler et al. |
| 5,930,370 A | | 7/1999 | Ruzicka |
| 5,946,343 A | | 8/1999 | Schotz et al. |
| 5,995,155 A | | 11/1999 | Schindler et al. |
| 6,212,282 B1 | | 4/2001 | Mershon |
| 6,278,499 B1 | * | 8/2001 | Darbee et al. .............. 348/734 |
| 6,466,832 B1 | | 10/2002 | Zuqert et al. |
| 6,608,907 B1 | | 8/2003 | Lee |
| 6,671,325 B2 | | 12/2003 | Lee et al. |

FOREIGN PATENT DOCUMENTS

| | | | |
|---|---|---|---|
| EP | 000535749 A2 | * | 7/1993 |
| EP | 1.318.504 | | 6/2003 |
| WO | WO00/33474 | | 6/2000 |

* cited by examiner

*Primary Examiner*—Edwin C. Holloway, III
(74) *Attorney, Agent, or Firm*—Michael I. Kroll

(57) ABSTRACT

A wireless content distribution system includes a controller for selectively controlling the system. The controller includes means for storing data and first means for transmitting and receiving data. At least one output device is connected to the controller for outputting data therefrom. The output device includes a second transmitting and receiving means. An input device inputs instructions and generates an instruction signal for transmission to and receipt by at least one of the first transmitting and receiving means and the second transmitting and receiving means. Upon said second transmitting and receiving means receiving the instruction signal, the second transmitting and receiving means further transmits the instruction signal for receipt by the first transmitting and receiving means. Upon receiving the instruction signal, the controller retrieves data stored on the storage device for transmission by the first transmitting and receiving means as a content signal for receipt by the second transmitting and receiving means for output by the output device.

9 Claims, 12 Drawing Sheets

MULTI-MEDIA WIRELESS SYSTEM

BACKGROUND OF THE INVENTION

1. Field of the Invention

The present invention relates generally to a media system, more specifically to a wireless media system that includes at least one group of media wirelessly connected to a controller. The controller includes a storage device for storing media thereon. The system further includes a remote unit for selectively controlling the controller to output music from the at least one group of speakers. The system is advantageous in that each of the remote unit, the speakers and the controller include a transceiver that is able to transmit and receive instruction signals. A user is able to use the remote unit to access and control the controller from a different room via the transceiver in the speakers. The at least one speaker group also include amplifiers for amplifying the received signals in order to further transmit the received signals to at least one of a second speaker group, the controller, and the remote unit. The media system may be used with at least one of a home entertainment center, a laptop computer and a desktop computer.

2. Description of the Prior Art

Numerous multi-music wireless systems have been provided in prior art. For example, U.S. Pat. Nos. 3,757,220, 5,867,223, 6,212,282, 5,425,370, 5,930,370, 6,466,832, 5,673,323, 5,946,343, 6,608,907, 5,793,980, 5,995,155, 6,671,325, European Patent No. EP 1318504 and International Patent No. WO/33474 all are illustrative of such prior art. While these units may be suitable for the particular purpose to which they address, they would not be as suitable for the purposes of the present invention as heretofore described.

U.S. Pat. No. 3,757,220

Inventor: Abel

Issued: Sep. 4, 1973

A wireless multi-channel FM receiver suitable for use in a classroom by students to selectively receive different instructional material simultaneously transmitted on different channels by an instructor. The receiver includes an RF antenna; RF narrow band filter circuit responsive to transmitted signals received by the antenna and selectively tunable to different channels for selectively passing received RF signals of only a single channel; and RF amplitude-limiter responsive to RF filter circuit output and having a bandwidth including, but not necessarily limited to or centered on, all RF channels; and detector responsive to the RF output of the amplifier-limiter and also having a bandwidth including, but not necessarily limited to or centered on, all of the RF channels.

U.S. Pat. No. 5,867,223

Inventor: Schindler, et al.

Issued: Feb. 2, 1999

A home entertainment and information system is provided which assigns and transmits audio programming to audio output devices. Digital and analog signals from a variety of program sources are received by the home entertainment and information system. The system assigns and transmits to an audio output device a program that is distinct from programs assigned and transmitted to other audio output devices within the same system, and thus where two users are viewing different programs visually displayed on the same or different monitors, they hear the audio portion of the respective program they are viewing through individual audio output devices. An audio output device is also assignable to a remote control device such that when a program is selected using the remote control device, the audio portion of the program is transmitted to the assigned audio output device.

U.S. Pat. No. 6,212,282

Inventor: Mershon

Issued: Apr. 3, 2001

A wireless speaker system includes a remote speaker device cooperating with a transmission unit. The remote speaker device includes a remote wireless communication device connected to a speaker via a digital to analog converter. The remote speaker device also includes a keypad. The transmission unit comprises an analog to digital converter and a source wireless communication device. The transmission unit may be connected to a home audio source such as a stereo. The transmission unit may also include a control device for controlling the home audio source via the keypad. The wireless speaker system allows access to a home audio system from virtually any location.

U.S. Pat. No. 5,425,101

Inventors: Woo, et al.

Issued: Jun. 13, 1995

A decoder in a multiservice communication system receives a plurality of services as data streams, including video, audio, teletext, and utility data, multiplexed in sequence of frames. Each service defines a virtual channel. Virtual channel packets contained in the multiplex include information for locating the data streams that compose the virtual channels and information for decrypting the data streams. Each virtual channel packet is transmitted in the multiplex each session of frames. When a user selects more than one virtual channel at a given time, the decoder extracts a virtual channel packet for a first selected virtual channel in a first session. The decoder can then provide the decrypted data streams for the first selected virtual channel to peripheral equipment. The decoder stores the information for locating and decrypting such data streams. In each succeeding session, the decoder extracts another selected virtual channel packet and provides the decrypted data streams for that selected virtual channel and for all previously authorized selected virtual channels. When a virtual channel packet for each selected virtual channel has been processed, the decoder repeats the cycle thereby providing the data streams for each selected virtual channel.

U.S. Pat. No. 5,930,370

Inventors: Ruzicka

Issued: Jul. 27, 1999

An apparatus for realistically reproducing sound, particularly for sound based on a stereophonic signal having dialog and effects and associated with an accompanying video image. The apparatus includes a front speaker located in proximity to the video image for providing acoustic output based upon a summation signal of the component left and right (L+R) channels of the audio signal. A rear speaker located to the rear of the viewing area provides acoustic output based upon a difference signal, (L−R) or (R−L), between the left and right channels. Left and right speakers located to the respective left and right sides of the viewing area. The left and right channels speakers reproduce in one embodiment the respective left and right channels of the audio signal and in a second embodiment reproduce a difference signal, (L−.beta.R) or (R−.beta.L), where .beta. is a gain which may vary or may be a value fixed between zero and unity. Output to the left and right speakers is band limited to substantially filter out frequency components below a predetermined threshold. A bass speaker may also be provided to output the low frequency components of a (L+R) summation signal. The (L+R) summation signal input to the front speaker assists in localizing dialog to the video image. The (L−.beta.R) or (R−.beta.L) difference signal substantially removes dialog sound so that the side and rear speaker output primarily comprises sonic ambience and surround sound effects. Band limiting the left and right speakers further assists in localizing dialog to the video image. Alternatively, in yet another embodiment, a monophonic signal may be applied to at least one embodiment of the system to enable production of a spatially enhanced surround sound effect.

U.S. Pat. No. 6,466,832

Inventors: Zuqert, et al.

Issued: Oct. 15, 2002

A wireless transmission system for transmitting audio data. The system includes a transmitter which re-frames the audio data into a plurality of packets and wirelessly transmits at least two copies of each packet during substantially non-overlapping periods, and one or more receivers which receive the plurality of packets and assess a quality level of at least one of the copies thereof, so as to extract the audio data from one of the copies having a desired quality level. Preferably, the receivers include respective back-transmitters, which transmit control commands back to the transmitter, responsive to the data.

U.S. Pat. No. 5,673,323

Inventors: Schotz, et al.

Issued: Sep. 30, 1997

An analog spread spectrum wireless speaker system for use in consumer audio applications for providing reliable and high fidelity stereo sound. The system includes a transmitter that accommodates any analog input from a variety of audio devices such as compact disk players, cassette players, AM/FM tuners and transmits this information in the 2.4-2.4835 GHz band to a receiver at a remote location. The receiver is capable of reproducing the audio signal with good frequency and signal-to-noise performance.

U.S. Pat. No. 5,946,343

Inventors: Schotz, et al.

Issued: Aug. 31, 1994

This invention discloses a digital wireless speaker system for use in consumer audio applications. A digital radio frequency transmitter is connected to an analog or digital audio source and a digital radio frequency receiver provides for reception of the transmitted audio information in remote locations. In addition, the digital receiver will be able to receive control information to implement such things as volume, tone controls, or other auxiliary information. This allows the user to listen to high quality audio in a variety of locations without the need of independent stereos or external wires. The system is based on digital circuitry to improve the performance of the system and provide for compact disc quality sound. The digital circuitry incorporates forward error correction techniques and interleaving to enable the system to account for errors in transmission and thus improve the overall performance of the system.

U.S. Pat. No. 6,608,907

Inventors: Lee

Issued: Aug. 19, 2003

An audio output apparatus having a wireless speaker is provided in an apparatus which outputs audio signal of 5.1 channel. In the audio output apparatus, an audio signal encoded in accordance with an IEEE 1394 protocol is received by a sub-woofer speaker through an IEEE 1394 communication line, is decoded in the sub-woofer speaker, is modulated by a spread spectrum FM modulation method, and is then transmitted to a plurality of wireless-connected speakers so as to be outputted. When the audio signal encoded by an IEEE 1394 communication protocol is outputted to the sub-woofer speaker through a first interface circuit, the encoded audio signal is, in accordance with a control signal from a controller provided in the sub-woofer speaker, received by a second interface circuit, and is decoded in real time by a decoder so as to output it externally while, at the same time, it is modulated by a spread spectrum FM modulation method, and is then transmitted to the wireless-connected plurality of speakers so as to be demodulated and outputted.

U.S. Pat. No. 5,793,980

Inventors: Glaser, et al.

Issued: Aug. 11, 1998

An audio-on-demand communication system provides real-time playback of audio data transferred via telephone lines or other communication links. One or more audio servers include memory banks which store compressed audio data. At the request of a user at a subscriber PC, an audio server transmits the compressed audio data over the communication link to the subscriber PC. The subscriber PC receives and decompresses the transmitted audio data in less than real-time using only the processing power of the CPU within the subscriber PC. According to one aspect of the present invention, high quality audio data compressed according to lossless compression techniques is transmitted together with normal quality audio data. According to another aspect of the present invention, metadata, or extra data, such as text, captions, still images, etc., is transmitted with audio data and is simultaneously displayed with corresponding audio data. The audio-on-demand system also provides a table of contents indicating significant divisions in the audio clip to be played and allows the user immediate access to audio data at the listed divisions. According to a further aspect of the present invention, servers and subscriber PCs are dynamically allocated based upon geographic location to provide the highest possible quality in the communication link.

U.S. Pat. No. 5,995,155

Inventors: Schindler, et al.

Issued: Nov. 30, 1999

An entertainment system has a personal computer as the heart of the system with a large screen VGA quality monitor as the display of choice. The system has digital satellite broadcast reception, decompression and display capability with multiple radio frequency remote control devices which transmit self identifying signals and have power adjustment capabilities. These capabilities are used to provide context sensitive groups of keys which may be defined to affect only selected applications running in a windowing environment. In addition, the remote control devices combine television and VCR controls with standard personal computer keyboard controls. A keyboard remote also integrates a touchpad which is food contamination resistant and may also be used for user verification. Included in the system is the ability to recognize verbal communications in video signals and maintain a database of such text which is searchable to help identify desired programming in real time.

U.S. Pat. No. 6,671,325

Inventors: Lee, et al.

Issued: Dec. 30, 2003

A system for transmitting, receiving, recovering, and reproducing digitized samples of analog signals while concealing unrecoverable digitized samples of analog signals to maintain a level of fidelity in reproducing the analog signals. The digitized samples of the analog signals are burst transmitted such that the probability of interference with the transmission and thus corruption of the digitized samples of the analog signals is minimized. The digitized samples are received without synchronizing a receiving clock with a transmitting clock to capture the digitized samples of the analog signals. The digitized samples are converted from various sampling rates to digitized samples of the analog signals having a rate. Any large groups of digitized samples that are in error or corrupted in transmission are softly muted to avoid annoying clicks. Any long term difference between a transmit clock and a receive clock is tracked and the digitized samples are interpolated or decimated to eliminate any underrun or overrun of the digitized samples.

European Patent Number EP1318504

Inventors: Hendricks, et al.

Issued: Nov. 6, 2003

An architectural sound enhancement system (200) is provided for installation in a space having a suspended ceiling (210) to provide integrated masking, background, and paging functions. The system includes an array of flat panel speaker units (201), a central paging transmitter (220), and a wireless remote control unit (222). The speaker units are adapted to be installed in a selected location within a suspended ceiling grid and can be moved to a new location as needed and desired. Each speaker unit is self-contained and includes, in one embodiment, an electronics module (204) housing a system controller with radio frequency detection capability, a sound generator having a library of stored sounds, an audio effects processor including an equalizer, a sound enhancer, an audio pre-amplifier, an audio power amplifier, and a flat panel speaker (208). The system controller is adapted to receive control signals from the remote control unit and to control the volume and equalization of the speaker unit as well as to select sounds from the sound library for reproduction and to upload new sounds from the remote control unit to the library. Paging announcements are transmitted wirelessly from the central paging transmitter and received by selected ones of the speaker units for broadcasting a page or other audio message.

International Patent Number WO00/33474

Inventors: Knab, et al.

Issued: Jun. 8, 2000

A multi-channel wireless speaker system using multiplexed channel combining and frequency diversity is described. The invention is directly applicable to the communication of audio signals between audio signal generators, such as home theater systems, stereo amplifiers, radio receivers, and other similar audio systems. This invention is adapted to provide multiple audio signals (211-217) on a single communication channel. It is specifically adapted to be used with RF wireless (207) and/or AC power line communication channels. This invention avoids the requirement for dedicated wiring connecting the audio signal source and the audio speakers. Moreover, this invention permits a large number of audio signals (211-217) to be separately modulated (201a-201n) and summed (204) on a single composite signal as well as a receiver able to demodulate and demux the composite into the many audio signals which are capable of connection to speakers.

SUMMARY OF THE INVENTION

The present invention relates generally to a media system, more specifically to a wireless media system that includes at least one group of media wirelessly connected to a controller. The controller includes a storage device for storing media thereon. The system further includes a remote unit for selectively controlling the controller to output music from the at least one group of speakers. The system is advantageous in that each of the remote unit, the speakers and the controller include a transceiver that is able to transmit and receive instruction signals. A user is able to use the remote unit to access and control the controller from a different room via the transceiver in the speakers. The at least one speaker group also include amplifiers for amplifying the received signals in order to further transmit the received signals to at least one of a second speaker group, the controller, and the remote unit. The media system may be used with a home entertainment center, a laptop computer or a desktop computer. Also other uses are video, computer networks, etc.

The multi-media wireless system is a multi-functional system that can produce any type of data, be it audio, video or general digital data from and provide said data to numerous devices. It does this by having a main controller that stores, sorts, and transmits all the data to other devices, then when requested by a remote unit or to the controller itself, transmits the data to a device or remote unit. The device could be a wireless speaker, wireless television controller, or wireless computer. When the information is then transmitted it is received by all devices, and then retransmitted to other devices, except to remote units. Should the remote unit request data, the signal request is sent to the main controller via at least one of line-of-sight and transmission through at least one of the devices back to the main controller if it is out of range or sight for transmission. The full advantage provided by this system is that data can be accessed through devices wirelessly to themselves or to a remote unit that are not even in the same vicinity as the main controller. It gives the freedom of mobility and does not need to have wires to communicate with one another.

The main controller may be included in any convention home electronic equipment including but not limited to a stereo system for audio, or a set-top television receiver for receiving satellite or cable transmissions, a computer server connected via a LAN or a WAN, or even a desktop or laptop computer. Preferably, the controller includes a plurality of input and output (I/O) ports including at least one of a USB port, coaxial cable port, an RJ-45 port and antenna hookups, for a wide range of flexibility and adaptability for each environment.

The devices connected to the main controller include at least one of wireless speakers, to a desktop or laptop computer. Also a television receiver device that is used in place of multiple satellite boxes, digital cable boxes, or VCR/DVD components, when all of the previous media can be transmitted from the main controller to the television receiver and can play the above mentioned, with just one receiver instead of multiple devices for multiple televisions.

Additionally, devices including wireless security cameras or a car stereo are selectively connected to and able to communicate with the main controller. The car stereo can trade information with the main controller and the stereo is able to selectively receive data from other storage devices having data stored thereon. These storage devices include memory cards and portable hard disk drives. In order for it to transmit to the main controller it must be within 300 feet of the main controller or closer. Remotes can be used with the car stereo or security camera's just as the speakers are.

Also the system includes a remote access function whereby wireless security cameras are connected to and controlled by the main controller. A user can selectively connect to the main controller using a cellular phone with picture or video capabilities for viewing the video data being recorded by any one of the security cameras connected to the main controller. The user enters a security code, and chooses which cameras they want to view, or view all cameras data. Also as a remote function, the cellular user could also direct at least one of audio and video data to be output by a respective one of the electronic devices connected to the main controller.

The remote unit is able to control the main controller via input buttons. Additionally, the remote unit may include output means whereby audio and/or video data is output therefrom. In this embodiment the remote unit includes at least one speaker and one display screen for outputting the at least one video and audio data. The display screen is able to display at least one of a received television broadcast, a DVD movie, or even a recorded digital home movie. The remote unit also may include an input device such as a microphone. Another remote unit could be a personal digital assistant for selective interaction with computers wirelessly and extracts or uploads files directly to the computer or network server. Each can be used as a listening device and also a wireless microphone device.

A primary object of the present invention is to provide a multi-media wireless system that overcomes the shortcomings of the prior art.

Another, secondary object of the present invention is to provide a multi-media wireless system including a controller having media stored thereon.

Another object of the present invention is to provide a multi-media wireless system including at least one group of devices for outputting media stored within the controller.

Still another object of the present invention is to provide a multi-media wireless system including a remote unit for selectively controlling the controller.

A further object of the present invention is to provide a multi-media wireless system wherein the devices in the at least one group of devices include transceivers for sending and receiving at least one of instruction signals and content signals.

Yet another object of the present invention is to provide wherein the remote unit includes a transceiver for sending and receiving at least one of instruction signals and content signals.

Still a further object of the present invention is to provide a multi-media wireless system wherein the controller includes a transceiver for receiving instruction signals and sending content signals.

An even further object of the present invention is to provide a multi-media wireless system wherein the controller is controlled by the remote unit transmitting instruction signals to through the speaker transceiver for receipt by the controller.

Still a further object of the present invention is to provide a multi-music wireless system wherein a plurality of speaker groups are selectively connected to the controller for outputting content therefrom.

A further object of the present invention is to provide a multi-media wireless system wherein the controller can selectively output different content on any or all of the plurality of speaker groups connected thereto.

Still a further object of the present invention is to provide a multi-media wireless system wherein the speakers in each speaker group further include an amplifier for amplifying the at least one of instruction signal and content signal for better transmission to at least one of a second speaker group and the remote unit.

Another object of the present invention is to provide a multi-media wireless system wherein the controller can be formed as a set-top box for connection with a home theater system, a USB unit for connection and use with a laptop computer, and a media card for insertion within a CPU of a desktop computer.

Yet another object of the present invention is to provide a multi-media wireless system wherein the controller is able to selectively control, manage, store content such as data.

A further object of the present invention is to provide a multi-media wireless system wherein the remote unit includes a storage device and receives, stores and outputs desired content a listening device such as headphones. Also a small microphone input, for transmitting or recording live audio to the controller.

An even further object of the present invention is to provide a multi-media wireless system wherein the remote unit includes a display for displaying textual information about what content is playing on all speaker groups.

Yet another object of the present invention is to provide a multi-media wireless system that is simple and easy to use.

Still yet another object of the present invention is to provide a multi-media wireless system device that is inexpensive to manufacture and operate.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

DESCRIPTION OF THE REFERENCED NUMERALS

Figure 1:
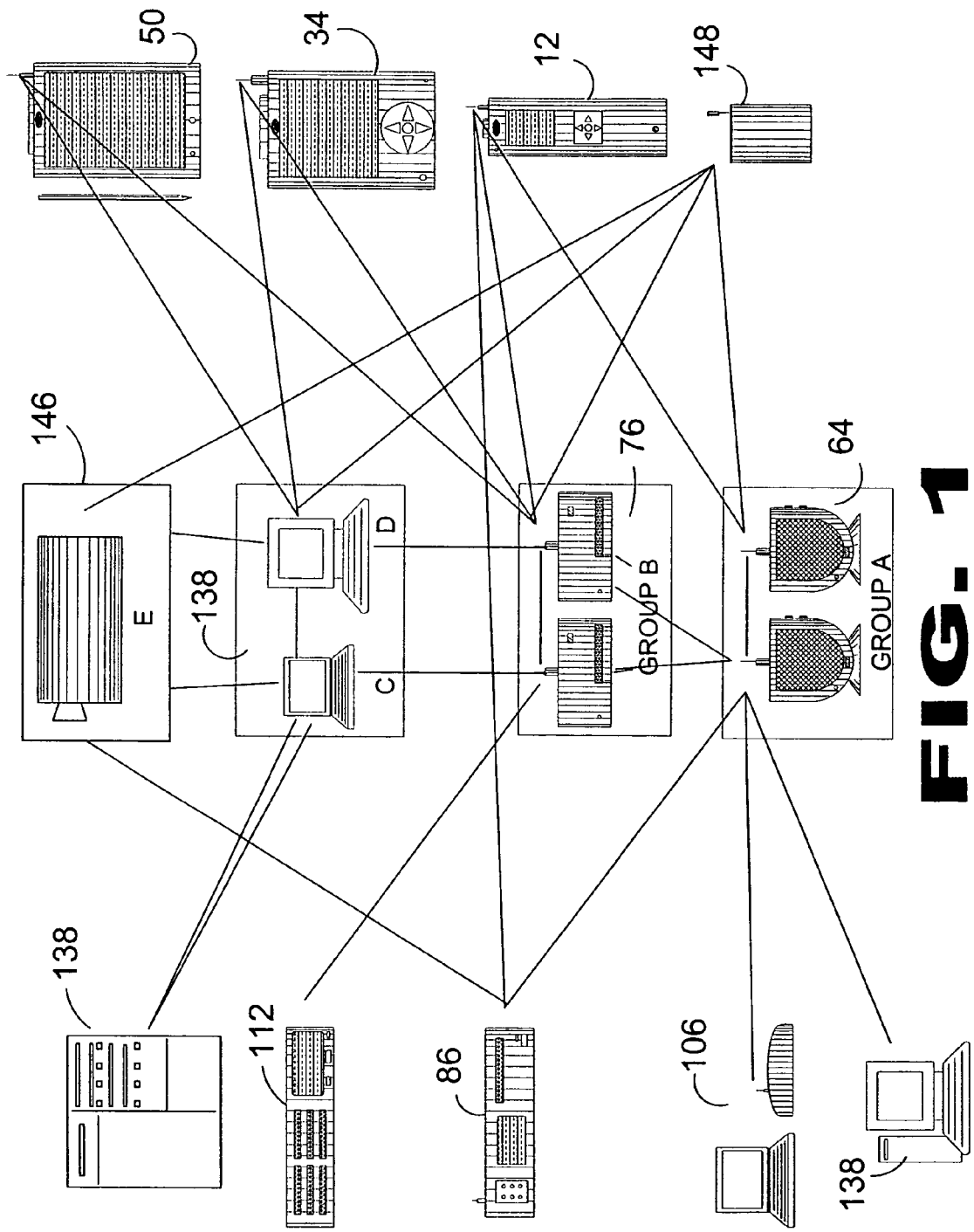
FIG. 1 is an illustrative view of the multi-media wireless system of the present invention in use.

Turning now descriptively to the drawings, in which similar reference characters denote similar elements throughout the several views, the Figures illustrate the multi-music wireless system of the present invention. With regard to the reference numerals used, the following numbering is used throughout the various drawing Figures.

10 the multi-media wireless system of the present invention
12 audio remote
14 remote IR transmitter
16 remote antenna
18 remote speaker
20 headphone adapter
22 microphone adapter
24 recharge electrodes
26 microphone
28 cursor buttons
30 remote display
32 power indicator
34 television remote
36 tv remote IR transmitter
38 tv remote antenna
40 tv remote speaker
42 tv remote display
44 tv remote power indicator
46 tv remote microphone
48 tv remote cursor buttons
50 palm computer remote
52 palm computer IR transmitter
54 palm computer antenna
56 palm computer speaker
58 palm computer display
60 palm computer microphone
62 palm computer power indicator
64 speaker
66 speaker antenna
68 wired remote controller port
70 power port
72 speaker IR receiver
74 speaker power indicator
76 television device
78 tv device antenna
80 tv device IR receiver
82 tv device CD\DVD
84 tv device power indicator
86 audio controller
88 audio controller controls
90 audio controller display
92 audio controller IR receiver
94 cable/satellite out
96 cable/satellite in
98 a/v ports
100 audio controller antenna
102 speaker ports
104 fiber port
106 portable computer controller
108 computer antenna
110 I/O connector
112 video controller
114 video controller display
116 video controller USB port
118 video controller IR receiver
120 power indicator
122 CD/DVD
124 cable out
126 cable/digital in
128 satellite in
130 a/v adapters
132 s-video in
134 fiber optic plug in
136 power cable plug-in
138 computer
140 sound card
142 sound card antenna
144 sound card controller
146 video camera
148 cellular phone

DETAILED DESCRIPTION OF THE PREFERRED EMBODIMENT

The following discussion describes in detail one embodiment of the invention. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 12 illustrate the multi-media wireless system of the present invention indicated generally by the numeral 10.

FIG. 1 is an illustrative view of the multi-media wireless system 10, hereinafter the "system" of the present invention in use. The system 10 includes a plurality electronic devices wirelessly connected to one another. A user is able to selectively control any respective one of the electronic devices connected as part of the system 10 using any other electronic device. Each component includes a transceiver for at least one of sending and receiving data signals and command signals. Additionally, each component includes an amplifier for amplifying the received signal and further broadcasting the received signal to at least one other component of the system 10 of the present invention.

FIG. 1 shows a plurality of electronic controller devices able to selectively store content data and control the system 10 of the present invention. The controller devices include an audio controller 86, a video controller 112, a portable computer controller 106, a desktop computer 138, and a remote server 139. The audio controller 86 has a storage device for storing audio data therein. The audio controller 86 also includes a plurality of input/output (I/O) ports for selectively connecting additional electronic devices thereto. These devices includes but are not limited to a CD player, a cassette deck, a record player and a minidisk player. The video controller 112 also includes a storage device for storing audio/video data thereon. The video controller also includes a plurality of I/O ports for connecting additional devices thereto. Devices able to be connected to the video controller 112 include but are not limited to a VCR, a DVD player, a VCD player and a set-top satellite/cable connector box. The portable computer controller 106 is selective connected to a laptop computer and is able to communicate with the computer to allow access to predetermined data stored thereon. The desktop computer controller 138 is at least one of an internal controller card and an external controller card connected to an I/O port. The server controller 139 is a software application able to be run on a system that allows remote systems access thereto.

The controllers 86, 106, 112, 138, 139 are connected to a plurality of input/output devices. Group A is speakers 64 for outputting sound therefrom. Group A is illustrated as a single pair of speakers but a plurality of pairs of speakers 64 can be connected to the system for outputting sound therefrom. Additionally, the plurality of pairs of speakers can be located in different locations from one another such as in different rooms of a house. Group B are video display devices 76 for displaying video data thereon. The video devices 76 are able to output audio/video data therefrom. Group B may include a plurality of video display devices located in different locales such as in different rooms throughout a house. Group C is a portable computer and group D is a desktop computer. Each one of the computers in groups C and D are able to output audio and video data thereon. Group E is at least one video camera 146. The video camera is able to capture and transmit audio/video data. Preferably, a plurality of video cameras 146 are connected to the system 10 of the present invention.

The system 10 is controlled using at least one of an audio remote 12, a video remote 34, a personal digital assistant 50 and a cellular phone. Each one of the above remotes includes input buttons corresponding to predetermined instructions for operating the system 10 of the present invention. The remotes are able to communicate with any of the controllers 86, 112, 106, 138, 139 and the groups of I/O devices (Groups A-E). Upon communicating with the above devices, the user is able to selective operate all system functions when in the presence of any device connected to the system 10.

The primary object of the system 10 is to provide the user the ability to have desired stored audio and video data provided to any one of a plurality of output devices. The desired stored data is stored within any of the controllers or is provided by an electronic devices connected to any one of the controllers. The user can use any one of the remote devices to transmit instruction signals which are received by at least one of an I/O device and a controller. The instruction signal includes content identification data which represents content the user desires to be output by an output device. If the signal is received by an I/O device, the instruction signal is further transmitted to the desired controller. The controller receives the instruction signal and causes desired content to be retrieved and transmitted as a content signal to a desired output device for output thereby.

Figure 2:
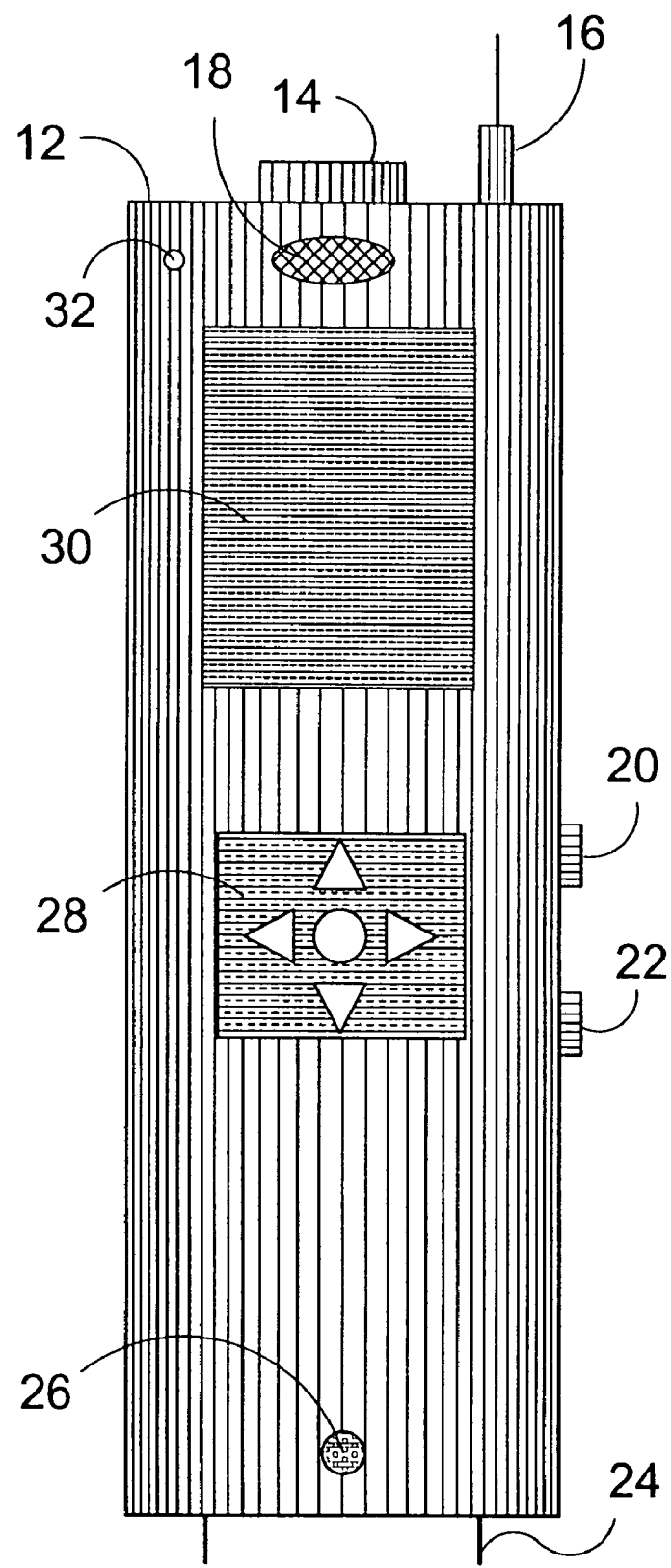
FIG. 2 is a front view of the audio remote controller of the multi-media wireless system of the present invention.

FIG. 2 is a front view of the audio remote controller of the multi-media wireless system of the present invention. The remote unit 12 is able to selectively control the system 10 of the present invention. The remote unit 12 is portable and can be easily transported to and from a plurality of locales and is used to control the system 10 from any one of the respective locales. The remote unit includes an IR transmitter 14 and an antenna 16. The remote unit 12 also includes a speaker 18 for outputting sound therefrom. The remote unit 12 further includes a headphone jack 20 and a microphone jack 22. A user can selectively connect headphones to the headphone jack 20 and have audio data output therefrom. A microphone can be selectively connected to the microphone jack 22 for at least one of inputting audio data and inputting instructions for controlling the system 10 of the present invention. Additionally, the remote unit has a microphone 26 positioned on a face side thereof. The user can selectively input instructions via the microphone 26 of the remote unit 12. Cursor buttons 28 are also positioned on a face side of the remote unit 12 and allow the user directional navigation of the system 10 of the present invention. A remote display unit 30 is further included on the remote unit 12. The display unit 30 allows the user to visual see stored data and/or components connected to the system 10. Alternatively, the display screen 30 can display video data thereon.

A user can selectively determine what data is to be output by an output device of the system 10 of the present invention. The remote unit 12 generates a specific instruction signal depending on user entered commands. The generated instruction signal is transmitted by the IR transmitter 14 for receipt by at least one of an I/O device and a controller. The instruction signal directs the controller to retrieve desired stored audio or audio/video data. The controller then transmits the desired data to a respective output device for output thereof. Alternatively, the desired data is transmitted to the remote unit 12 and received by the antenna 16 thereof. The received desired data is output by at least one of the speaker 18, the video display 30 and the headphone jack 20 of the remote unit. This allows the user to access the data when the user is not in the presence of any of the I/O devices connected to the system.

The audio remote 12 is preferably used to access audio data stored in the audio controller 86 as shown in FIG. 1. The user can selectively scroll through the stored data using the directional keypad 28. The data is viewable on the display screen 30. The user can selectively determine which audio data is the desired audio data to be output by the system 10 of the present invention.

Figure 3:
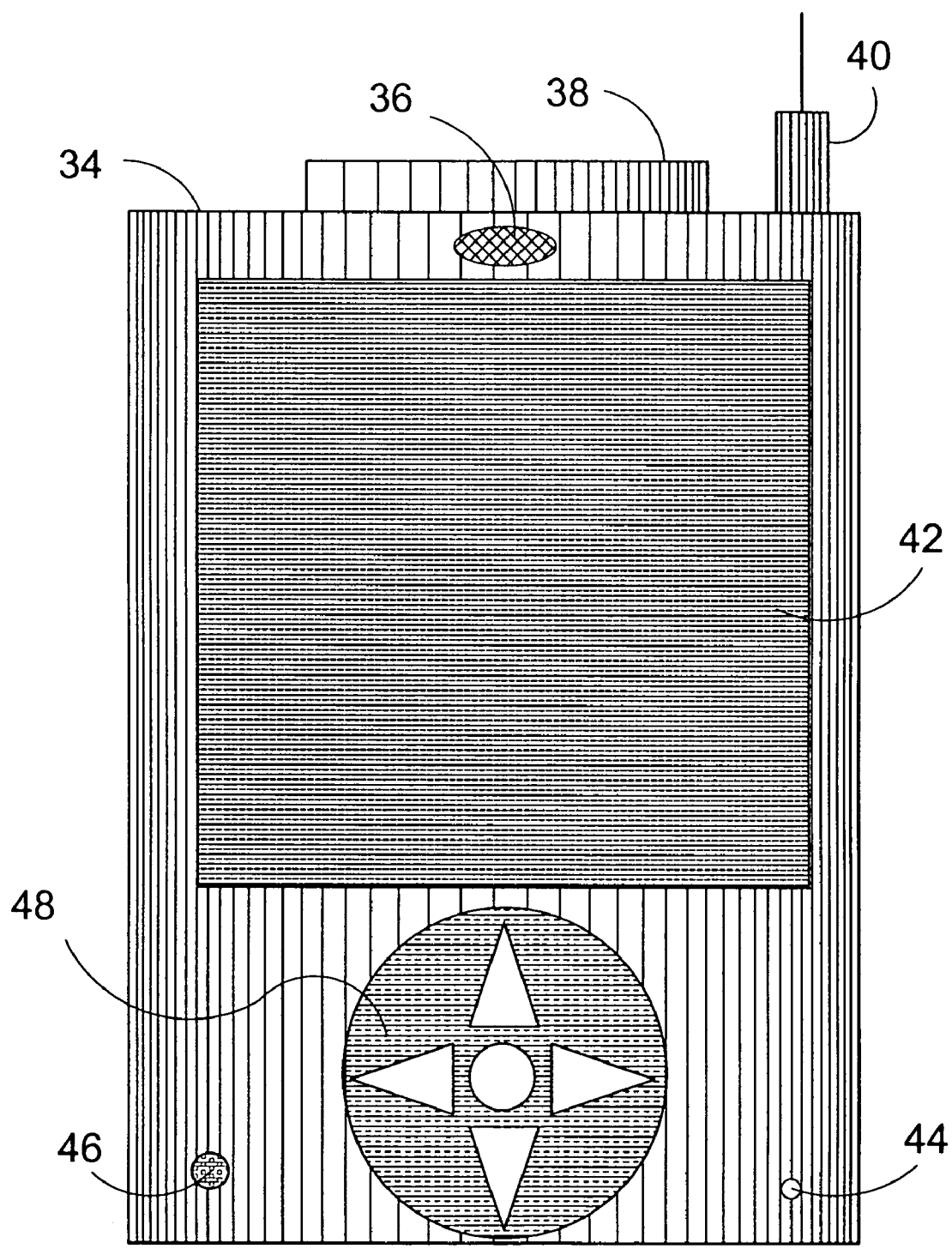
FIG. 3 is a front view of a television remote for use with the multi-media wireless system of the present invention.

FIG. 3 is a front view of a television remote for use with the multi-media wireless system of the present invention. The television remote 34 of the system 10 of the present invention is able to control audio-visual functions of the system 10. Thus, the video remote 34 is able to control at least one of a television, a DVD player, a VCR and a set-top cable/satellite decoder box.

The remote unit includes an IR transmitter 36 and an antenna 38. The remote unit 12 also includes a speaker 40 for outputting sound therefrom. The remote unit 34 has a microphone 46 positioned on a face side thereof. Cursor buttons 48 are also positioned on a face side of the remote unit 34 and allow the user directional navigation of the system 10 of the present invention. A remote display unit 30 is further included on the remote unit 34. The display unit 42 allows the user to visual see stored data and/or components connected to the system 10. Alternatively, the display screen 42 can display video data thereon.

A user can selectively determine what data is to be output by an output device of the system 10 of the present invention. The remote unit 34 generates a specific instruction signal depending on user entered commands. The generated instruction signal is transmitted by the IR transmitter 36 for receipt by at least one of an I/O device and a controller. The instruction signal directs the controller to retrieve desired stored audio or audio/video data. The controller then transmits the desired data to a respective output device for output thereof. Alternatively, the desired data is transmitted to the remote unit 34 and received by the antenna 38 thereof. The received desired data is output by at least one of the speaker 40 and the video display 42 of the remote unit 34. This allows the user to access the data when the user is not in the presence of any of the I/O devices connected to the system.

Figure 4:
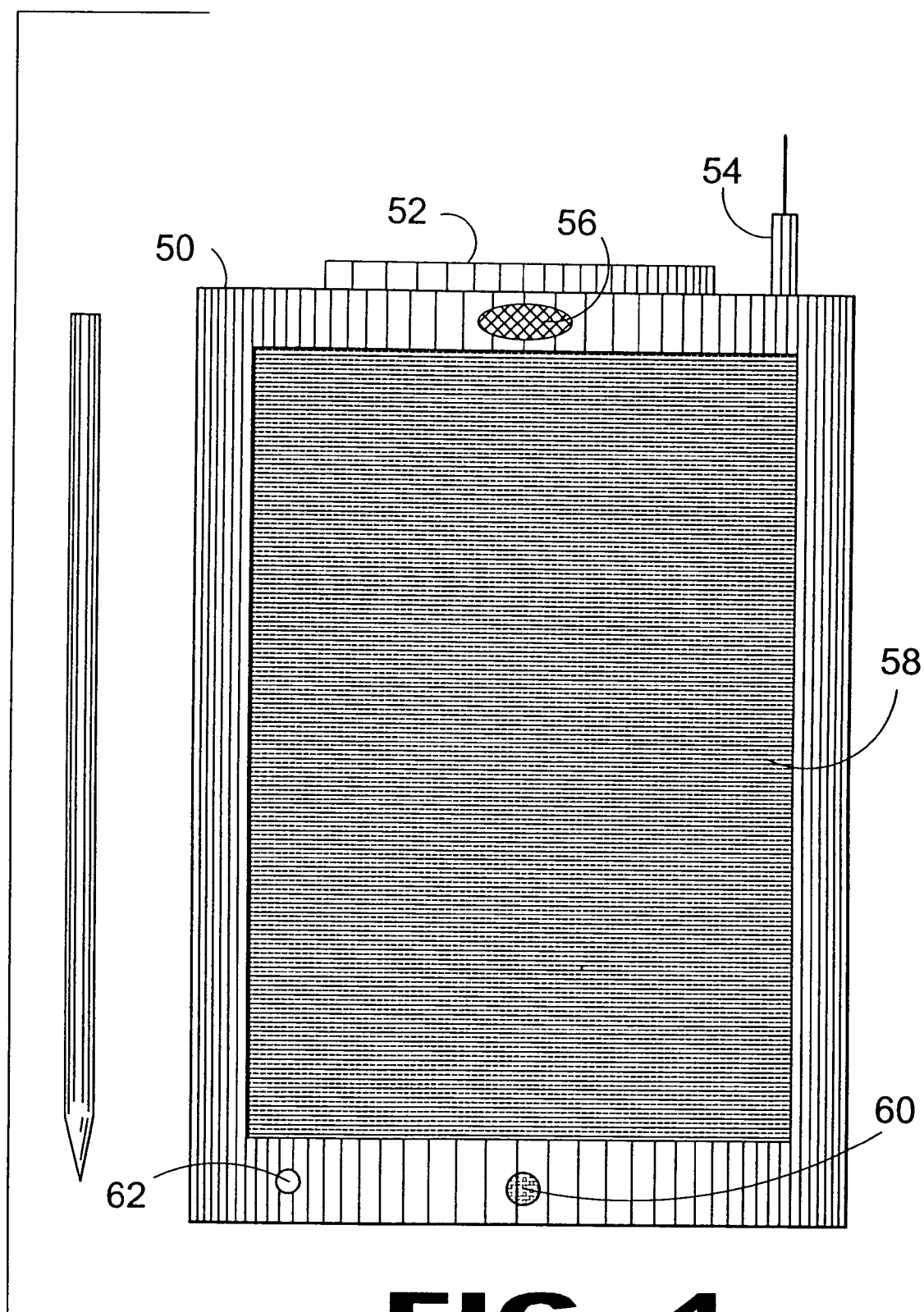
FIG. 4 is a front view of a palm computer remote for use with the multi-media wireless system of the present invention.

FIG. 4 is a front view of a personal digital assistant remote 50 for use with the multi-media wireless system of the present invention. The PDA remote 50 is able to selectively control the audio and audio-visual data stored in any of the controllers of the system 10 of the present invention.

The remote unit includes an IR transmitter 36 and an antenna 38. The remote unit 12 also includes a speaker 40 for outputting sound therefrom. The remote unit 34 has a microphone 46 positioned on a face side thereof. Cursor buttons 48 are also positioned on a face side of the remote unit 34 and allow the user directional navigation of the system 10 of the present invention. A remote display unit 30 is further included on the remote unit 34. The display unit 42 allows the user to visual see stored data and/or components connected to the system 10. Alternatively, the display screen 42 can display video data thereon.

A user can selectively determine what data is to be output by an output device of the system 10 of the present invention. The remote unit 34 generates a specific instruction signal depending on user entered commands. The generated instruction signal is transmitted by the IR transmitter 36 for receipt by at least one of an I/O device and a controller. The instruction signal directs the controller to retrieve desired stored audio or audio/video data. The controller then transmits the desired data to a respective output device for output thereof. Alternatively, the desired data is transmitted to the remote unit 34 and received by the antenna 38 thereof. The received desired data is output by at least one of the speaker 40 and the video display 42 of the remote unit 34. This allows the user to access the data when the user is not in the presence of any of the I/O devices connected to the system.

Figure 5:
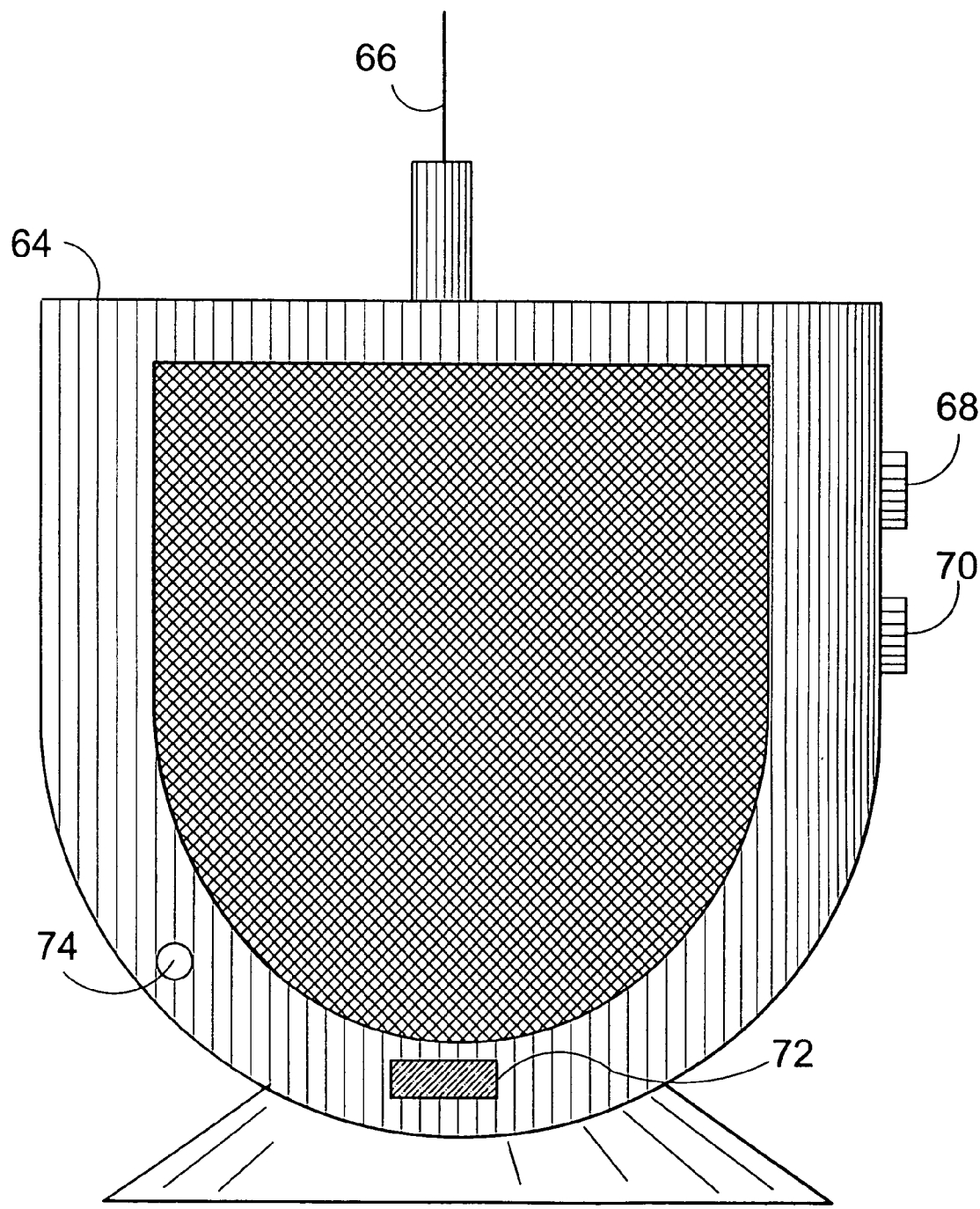
FIG. 5 is a front view of a speaker for use with the multi-media wireless system of the present invention being formed as a sound card.

FIG. 5 is a front view of a speaker for use with the multi-media wireless system of the present invention being formed as a sound card. The speaker 64 is one of I/O devices connected to the system. FIG. 5 shows only a single speaker 64. However, it is preferable that the system 10 includes a plurality of speakers positioned in different locales. Ideally, there would be at least a pair of speakers 64 in each locale to adequately output audio data therefrom. The speaker includes an IR receiver 72 and an antenna 66. The speaker also includes a power indicator 74, an input port 68 and a power port 70.

The IR receiver 72 receives the instruction signal from any one of the remote units as described above with respect to FIGS. 2-4. Upon receiving the instruction signal, circuitry within the speaker 64 causes the instruction signal to be further transmitted via the antenna 66 for receipt by any one of the controller units. The controller units then transmit a content signal for receipt by the speaker 64 via the antenna 66. The circuitry within the speaker 64 receives the signal and outputs the data contained therein.

Figure 6:
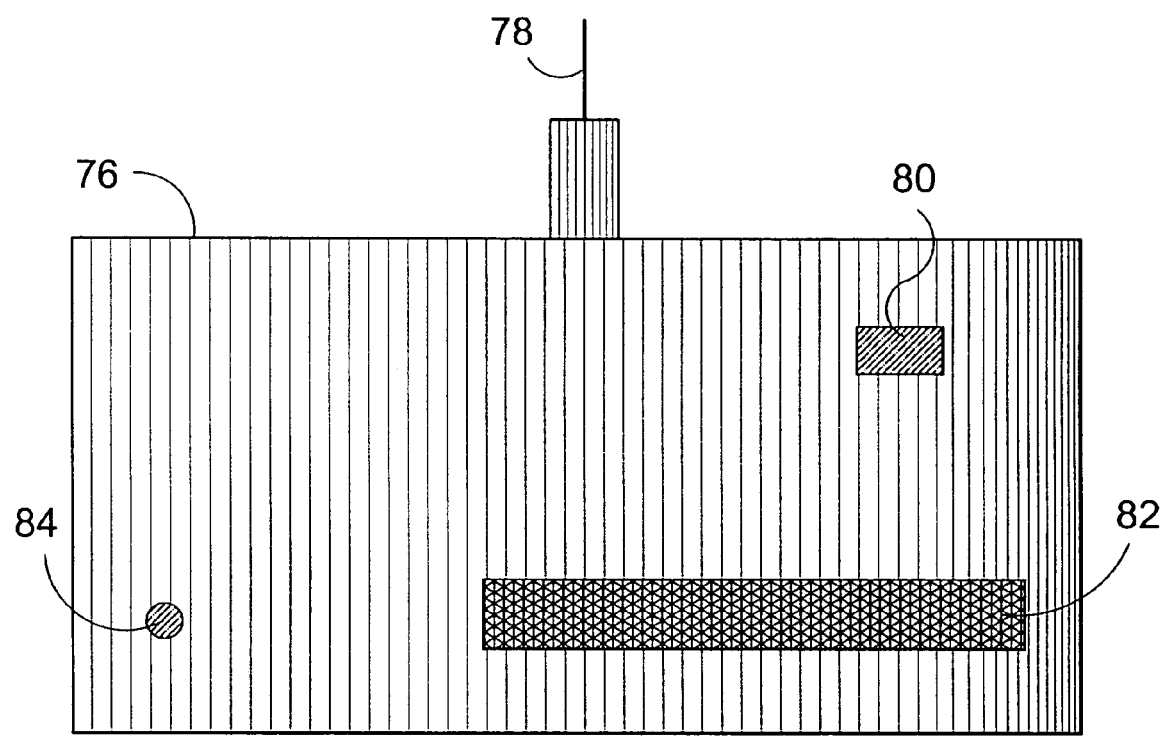
FIG. 6 is a front view of a television device for use with the multi-media wireless system of the present invention being formed as a sound card.

FIG. 6 is a front view of a television device for use with the multi-media wireless system of the present invention being formed as a sound card. The video controller device 76 as shown in FIG. 6 is intended to be connected to a monitor such as a television. The controller 76 includes an IR receiver 80 and an antenna 78. Also included is an input device 82 such as a CD/DVD. The video controller 76 has a storage device and is able to store data therein. The video controller 76 is able to selectively receive instruction signals from any of the remote units discussed hereinabove. The instruction signal is received via IR port 80. The video controller retrieves the stored data and transmits the stored data via the antenna 78 to be output on a respective I/O device connected thereto such as a television and/or speakers. Additionally, the remote unit can direct the video controller 76 to output the data stored on medium received within the input device 82.

Figure 7:
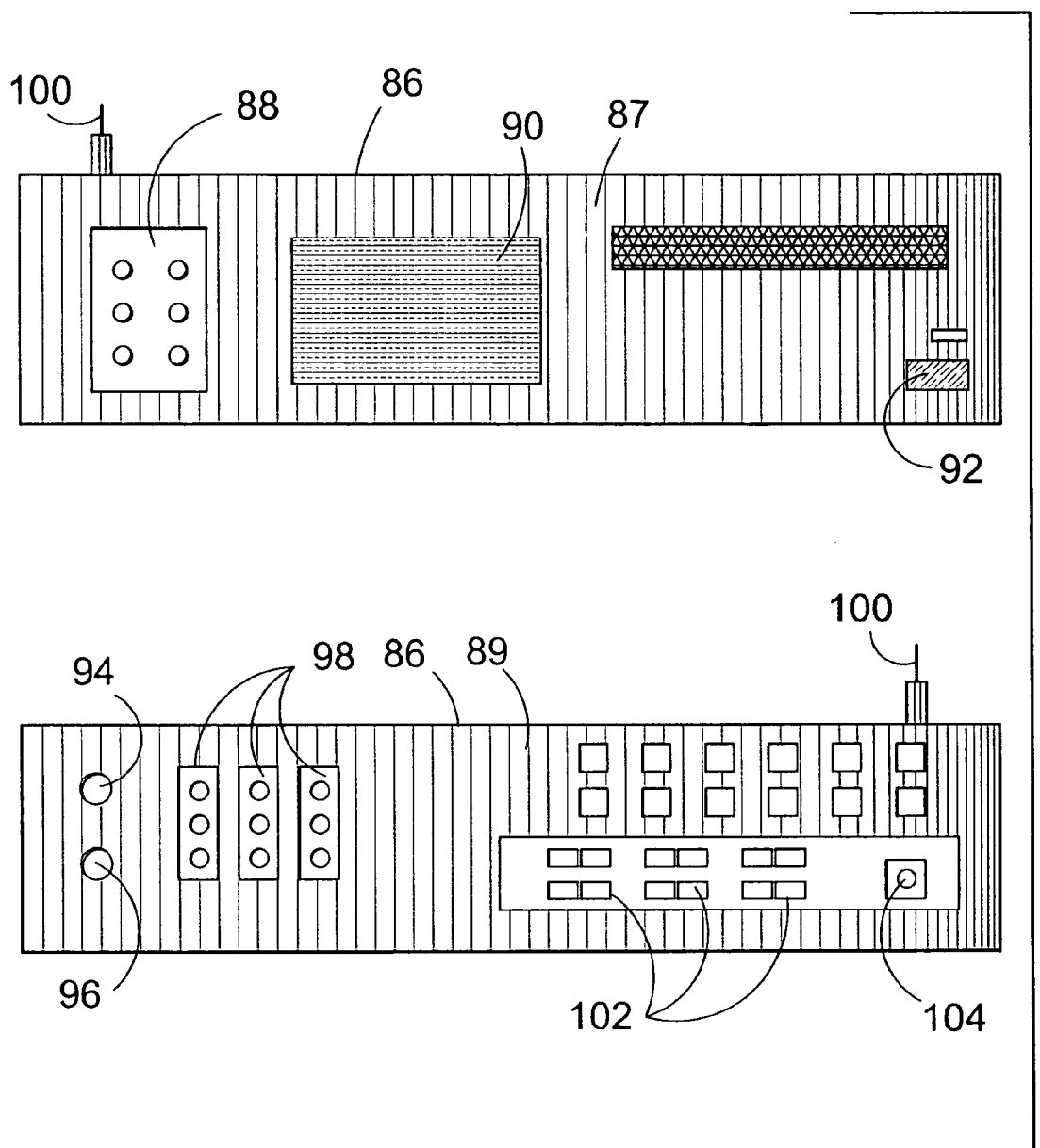
FIG. 7 is a front view of the audio controller of the multi-media wireless system of the present invention.

FIG. 7 is a front view of the audio/visual controller of the multi-media wireless system of the present invention. The A/V controller 86 has a front side 87 and a rear side 89. Positioned on the front side 87 are control buttons 88 for selectively controlling at least one of the controller 86 and at least one external device connected to the controller 86. Also positioned on the front of the A/V controller is a display screen 90 for displaying a visual representation of the data currently being output by the output device connected to the system 10. An IR port 92 for receiving instruction signals is positioned on the front side 87. An antenna 100 for selectively broadcasting and receiving content signals therefrom is also positioned on the A/V controller 100.

The rear side 89 includes a cable input 94 for receiving a broadcast television signal and cable output 96 for outputting that signal to an output device connected thereto. A plurality of A/V ports 98 are positioned on the rear side 89 for selectively connected external electronic devices to the A/V controller 86. Upon connection to the A/V ports 98, the devices are selectively controllable in the manner described above by the system 10 of the present invention. The A/V controller 86 further includes speaker ports 102 for selectively connecting speakers thereto. Preferably, these speakers are home-theater speakers for outputting audio data associated with the video data being output on the monitor connected thereto. However, the audio-video data of a desired program may be wirelessly transmitted to a monitor and speakers positioned in a different locale than the A/V controller 86.

The A/V controller 86 further includes a storage device able to store at least one of audio, video, and A/V data thereon. A computer is selectively connectable via a port 104 for adding and updating the data stored therein. The user of the system can selectively determine that data stored in the storage device of the A/V controller 86 be output to a desired output device using a remote control as described hereinabove with respect to FIGS. 2-4.

Figure 8:
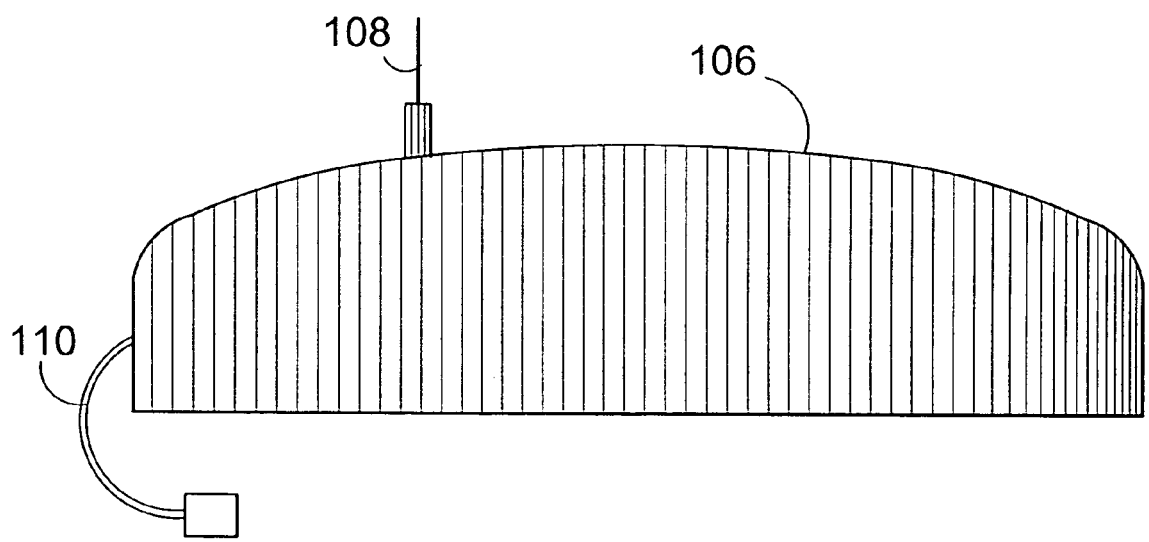
FIG. 8 is a front view of a portable computer controller of the multi-media wireless system of the present invention.

FIG. 8 is a front view of a portable computer controller 106 of the multi-media wireless system of the present invention. The portable computer controller 106 is shown herein as an external device that is selectively connectable to an I/O port on a portable computer via a connection wire 110. Preferably, the connection wire is at least one of a USB wire and a firewire cord. The controller 106 includes an antenna 108 for sending and receiving content and instruction signals therefrom. Upon connection to a portable computer via the connection cord 110, the controller 106 allows a user to access data stored on the portable computer. The user can selectively determine which data is to be made available for navigation by a user using one of the remote units as shown in FIGS. 2-4.

The user is able to selectively navigate and manipulate the selected data stored on the personal computer and determine desired data to be output on an I/O device connected to the system. The personal computer preferably has at least one of audio data, video data, and audio-visual data stored thereon. The data can be stored in any known format including but not limited to MP3 and MPEG formats. Upon inputting a command in a remote unit, an instruction signal is generated and transmitted from the remote to at least one of an I/O device and the controller 106. If the instruction signal is transmitted to and received by an I/O device, the I/O device amplifies and transmits the instruction signal for receipt by the controller 106. The controller decodes the instruction signal and retrieves the data desired by the user. The desired data is encoded as a content signal and transmitted from the antenna 108 for receipt by an antenna of at least one of an I/O device connected to the system such as speakers 64, video display monitor and a remote unit for output therefrom.

Alternatively, the portable computer controller 106 can be formed as PC card for insertion into a PCMCIA slot type II or type III slot on a laptop computer.

Figure 9:
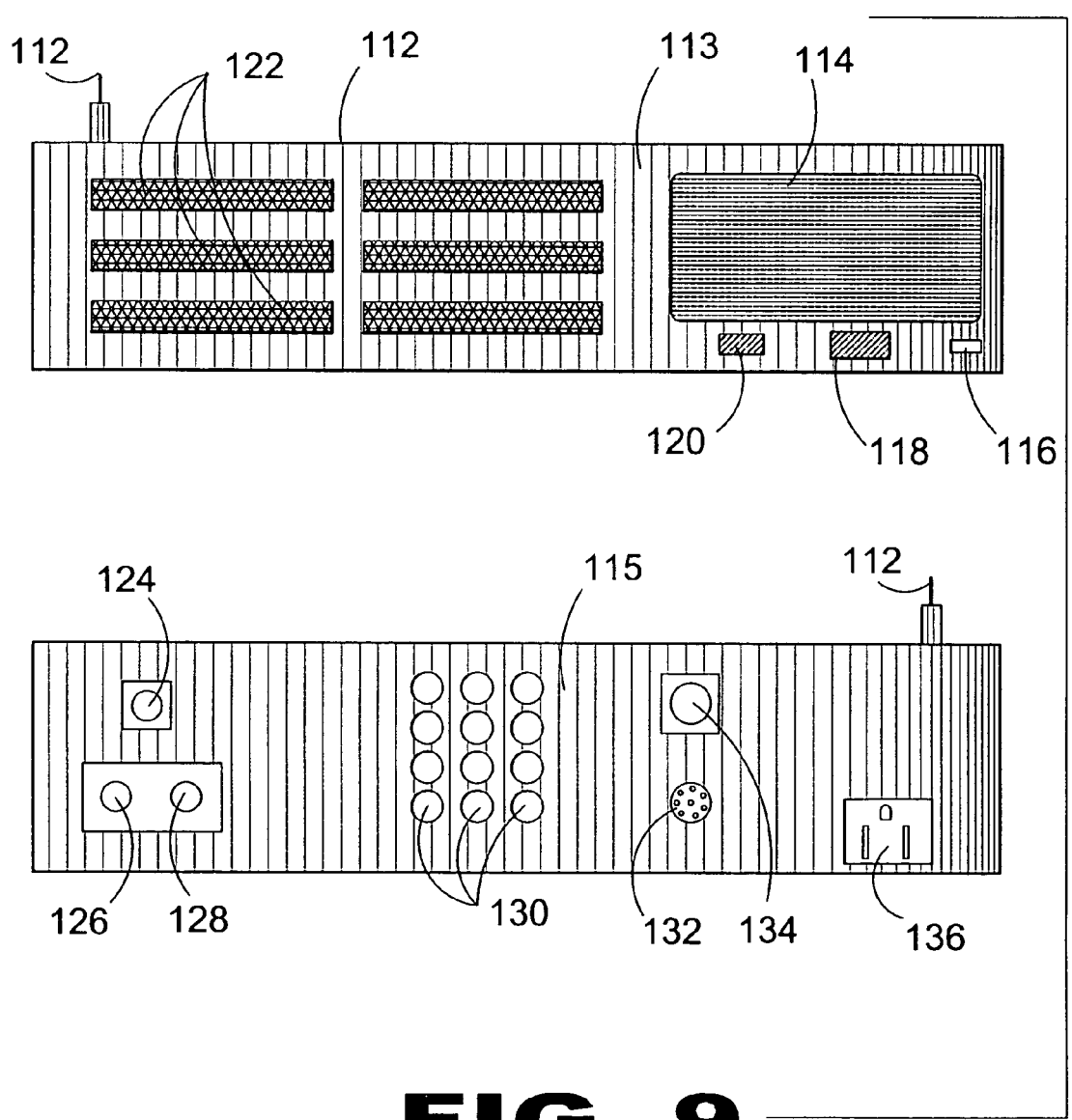
FIG. 9 is a front view of the video controller of the multi-media wireless system of the present invention.

FIG. 9 is a front view of the cable/satellite controller 112 of the multi-media wireless system of the present invention. The controller 112 has a front side 113 and a rear side 115. Positioned on the front side 113 is a display screen 114 for displaying a visual representation of the data currently being output by the output device connected to the system 10. An IR port 118 for receiving instruction signals is positioned on the front side 113. An antenna 111 for selectively broadcasting and receiving content signals therefrom is also positioned on the controller 112. The front side 115 further includes a plurality of CD/DVD players 122 for selectively receiving medium having data stored thereon.

The rear side 115 includes a cable input 124 for receiving a broadcast television signal and cable output 128 for outputting that signal to an output device connected thereto. Preferably, the input 124 is able to receive a digital television signal broadcast by a cable and/or satellite provider. A plurality of A/V ports 130 are positioned on the rear side 115 for selectively connected external electronic devices to the controller 112. Upon connection to the A/V ports 130, the devices are selectively controllable in the manner described above by the system 10 of the present invention. The controller 112 further includes video output ports 132 and 130. As shown herein, port 130 is a fiber optic port able to output digital data to a video display device. Output port 132 is an S-video output able to output a super video signal therefrom to a video display device. These output ports are described for purpose of example only and any output port for outputting at least one of analog and digital video data may be included in the controller 112 of the system 10 of the present invention.

The controller 112 further includes a storage device able to store at least one of audio, video, and A/V data thereon. A computer is selectively connectable for adding to and updating the data stored therein. The user of the system can selectively determine that data stored in the storage device of the controller 112 be output to a desired output device using a remote control as described hereinabove with respect to FIGS. 2-4.

Figure 10:
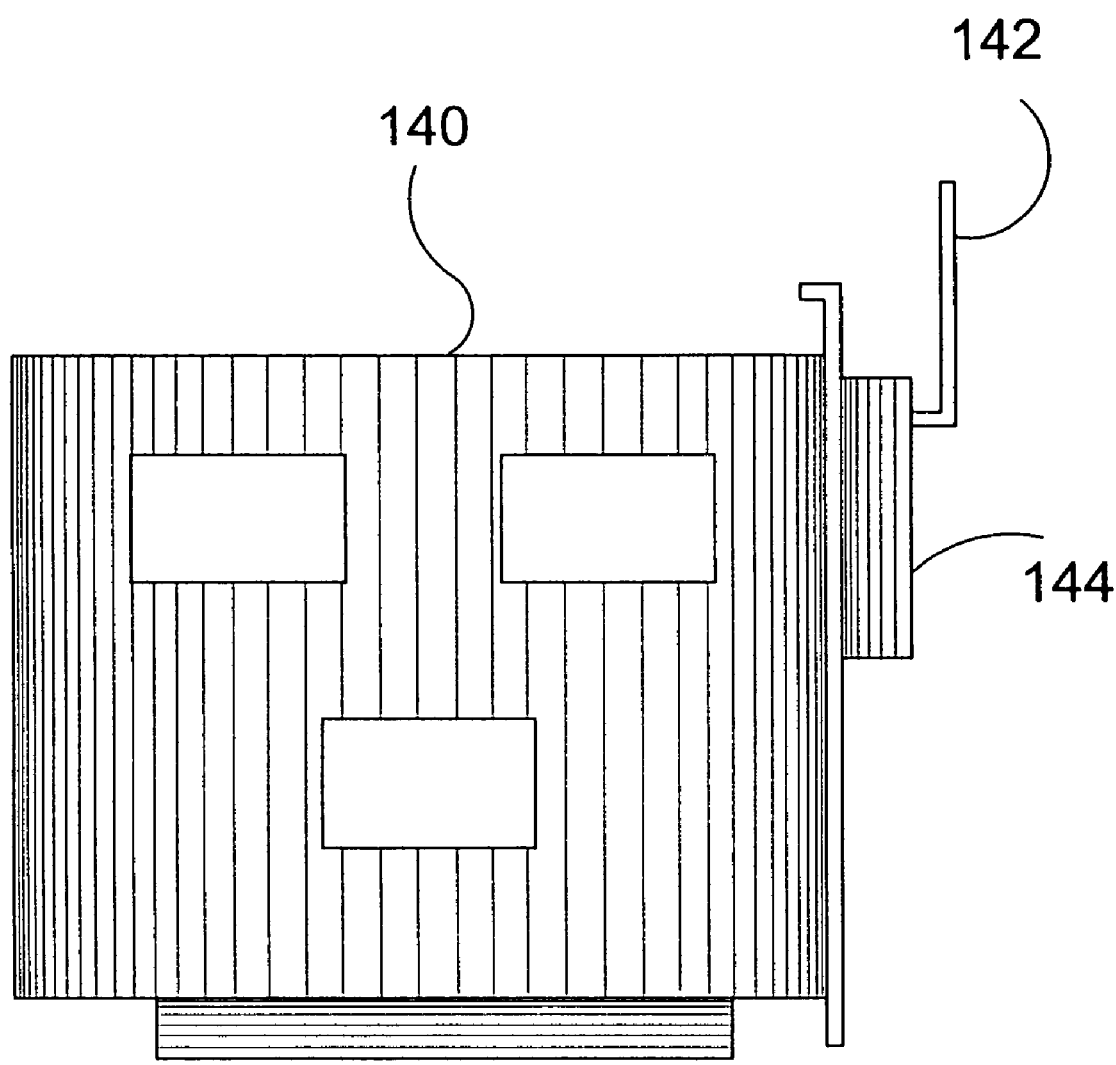
FIG. 10 is a front view of the controller of the multi-music wireless system of the present invention being formed as a sound card.

FIG. 10 is a front view of the card controller 140 of the multi-music wireless system of the present invention being formed as a sound card. The card controller 140 is the controller unit for selectively controlling a desktop computer 138 as shown in FIG. 1. The card is selectively inserted into an expansion slot on a motherboard of a computer. The card can be formed as at least one of a PCI and an AGP card for insertion in a respective slot on the motherboard. The card controller 140 includes a transmitter 144 and an antenna 142 for broadcasting and receiving at least one of instruction and content signals therefrom.

As the card is part of a desktop computer, the card allows the user to have any data stored thereon be output by the system 10 of the present invention. Additionally, the user can use executable software on the desktop to computer to allow the desktop computer to function as a remote unit similar to the manner discussed above with specific reference to FIGS. 2-4. Data can be transmitted from the desktop computer for output by one of the I/O devices connected to the system.

Additionally, the desktop computer is selectively connectable to at least one of a wide area network (WAN) and a local area network (LAN). Upon connection to either the WAN or LAN, the system 10 is then able to access any data across the respective network. Thus, this connection allows the user to use a remote unit to send an instruction signal to the controller 140 to access data that is located on a specific network and have that data be broadcast an output by an I/O device connected to the system 10 of the present invention.

Figure 11:
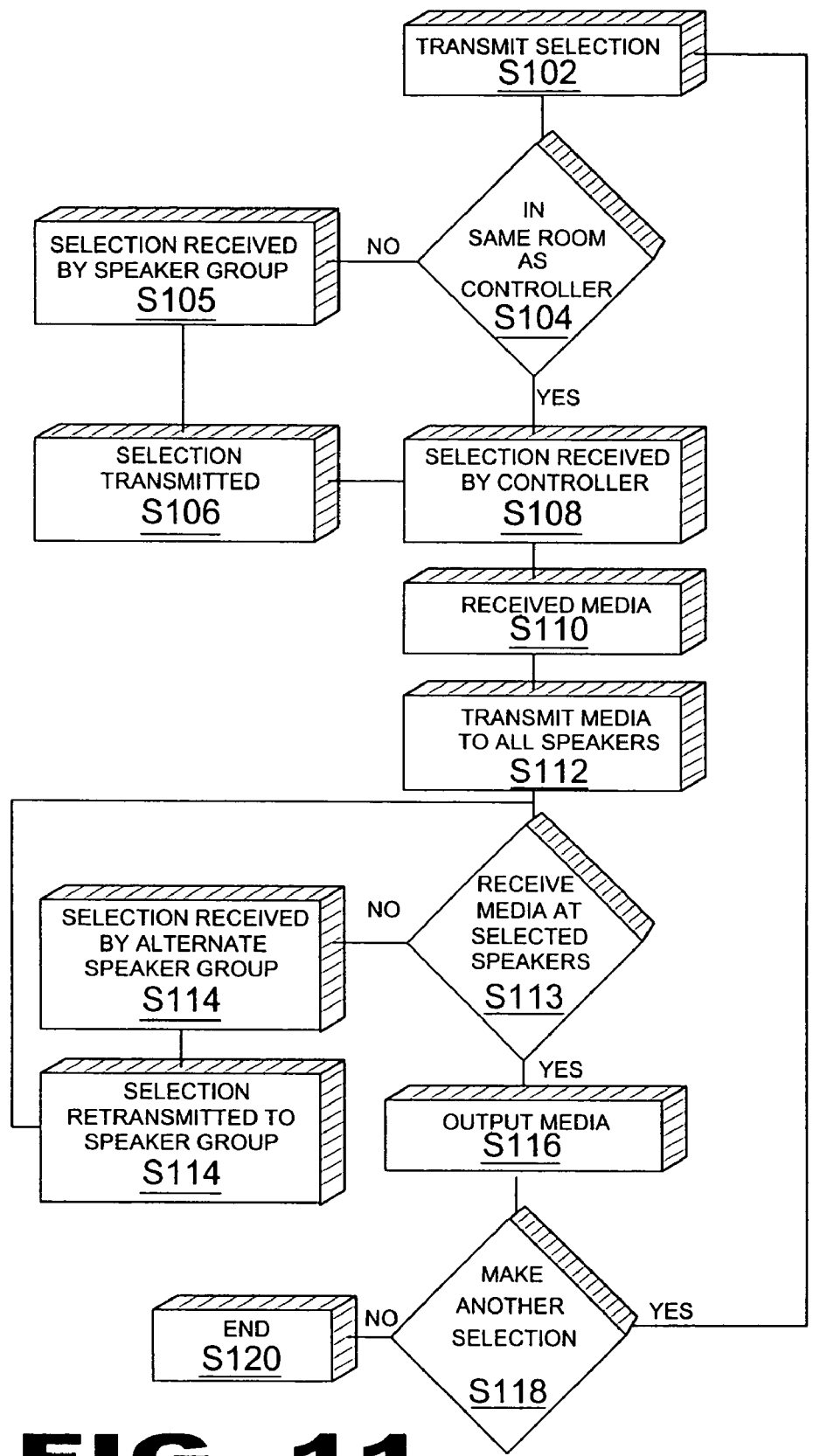
FIG. 11 is flow diagram of the multi-media wireless system of the present invention.

FIG. 11 is flow diagram of the multi-media wireless system of the present invention. This diagram details how data is selected and then output by the system 10 of the present invention. At step S102, the user uses a remote unit to transmit an instruction signal including a selection. Thereafter, the system determines if the user is in the same room as the controller in step S104. If the user is in the same room as the controller then the process continues at step S108. If however, the user is not in the same room, then step S105 shows that the instruction signal is received by an I/O device, such as speakers and that instruction signal is then amplified and further transmitted to the controller in step S106. Once the signal is received by the controller in step S108, the controller retrieves data as directed by the instruction signal as in step S110. Upon retrieving the data, the data is transmitted as a content signal to a desired I/O device such as speaker as shown in step S112. The content signal is then received by an I/O device and a determination is made as to whether the desired I/O device has received the desired data as shown in step S113. If the desired I/O device received the content signal containing the desired data, then the data is output by the device as in step S116. If the I/O device that received the content signal is not the desired device, then the process continues at step S114. The content signal is then further transmitted to the desired I/O device and the data contained in the content signal is output as in step S116. The system then determines if additional data is to be retrieved and output by the system in step S118. If not, the system ends at step S120. If the user desires to select additional data, the process begins again at step S102.

It is important to note that this process is the same irregardless of the data selected at step S102. The data selected is at least one of audio data, video data, and audio-visual data.

Figure 12:
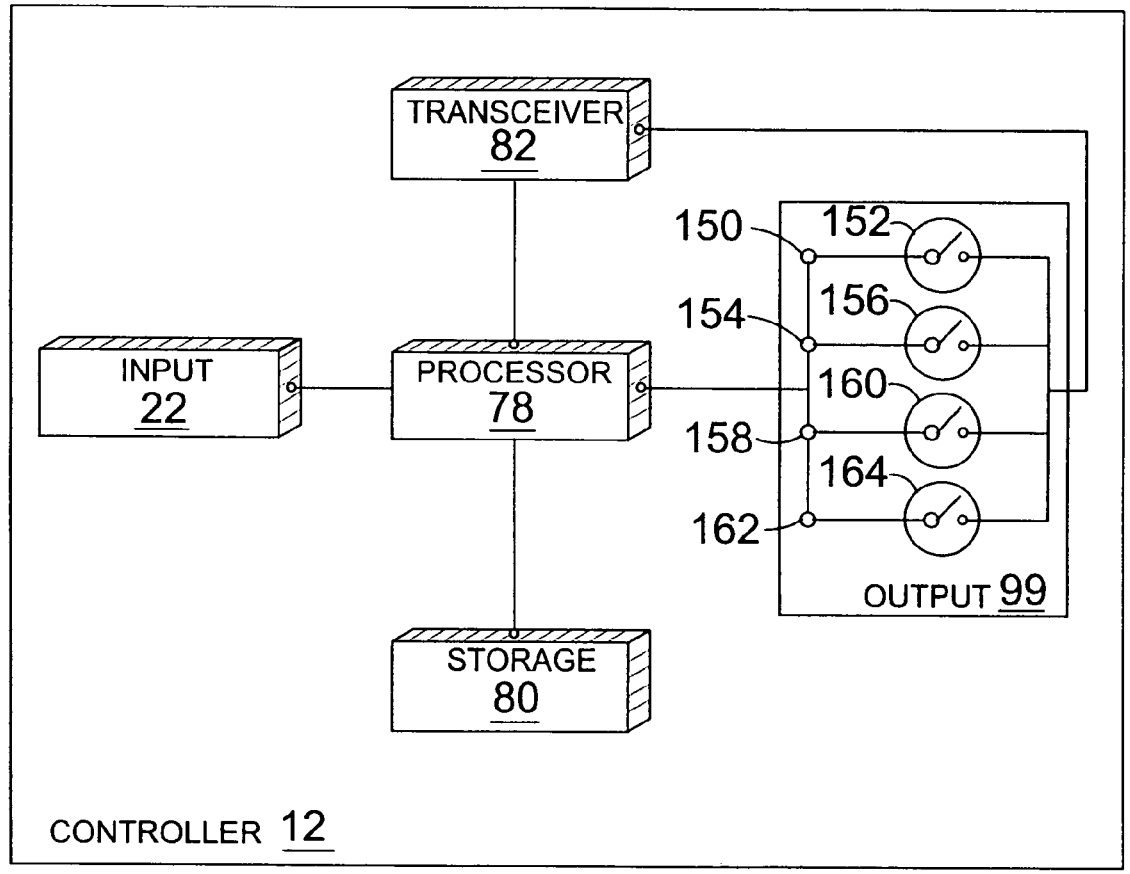
FIG. 12 is block diagram of the multi-media wireless system of the present invention.

FIG. 12 is block diagram of the multi-media wireless system of the present invention. FIG. 12 shows the internal circuitry present in any one of the controllers described in FIGS. 5-9 hereinabove. The controller includes a processor 78 for controlling operation thereof. Input 22, storage device 80 and a transceiver 82 are connected to the processor 78. Also connected to the processor 78 are a plurality of output devices 99. The output devices 99 are also connected to the transceiver 82. The output devices include a first output 150 having a first switch 152, a second output 154 having a second switch 156, a third output 158 having a third switch 160 and a fourth output 162 having a fourth switch 164.

The user selectively inputs an instruction using the input 22 of the system 10. The input 22 is any means of inputting instructions into the system including but not limited to remote units and control buttons. The input 22 directs the processor to retrieve data stored on the storage device 80 for output by at least one of the output devices 99. The processor 78 also causes a respective one of the output switches to move from a first open position to a second closed position. The processor 78 then directs the retrieved data to be transmitted by the transceiver 82 to the respective output having the switch in the second closed position.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A wireless content distribution system comprising:
   a) an audio only controller and an audio/video controller for selectively controlling audio only and audio/video signals within the system, each said controller including means for storing, transmitting and receiving audio only and audio/video data, respectively;
   b) audio and audio/video output devices connected to said controllers for outputting data therefrom, said output devices including means for transmitting and receiving data, said audio output devices comprising speakers and said audio/video output devices comprising television monitors distributed throughout different rooms;
   c) an audio remote device and an audio/video remote device for inputting instructions to said respective controller for delivering selected stored audio and audio/video data in said controllers to each of said output devices as directed by said respective remote device;
   d) each of said audio and audio/video remote devices having a screen for displaying data stored in a respective controller and having cursor buttons for selecting the data on its respective controller to be transmitted to an output device, each remote device being able to communicate with each controller and each output device for selectively operating all system functions,
   e) said audio remote device also having a speaker for outputting sound, a headphone jack for listening to audio selected output and a microphone jack for inputting audio data and instructions for controlling said system;
   f) said audio/video remote device also having a speaker, and a microphone, and
      a video camera to capture and transmit audio/video data.

2. The system as recited in claim 1, wherein said system includes a computer controller and a corresponding output device which is a computer.

3. The system as recited in claim 2, wherein said computer controller includes at least one of a desktop computer controller and a laptop computer controller, wherein said computer controller controls access to data stored thereon.

4. The system as recited in claim 3, having a cellular telephone as a remote input to said system.

5. The system as recited in claim 4, having a personal digital assistant further as a remote input to said system.

6. The system as recited in claim 5, wherein said cellular telephone and said personal digital assistant are able to selectively access any controller to view recorded video data on a screen thereof.

7. The system as recited in claim 1, wherein said controllers further comprise means for accessing at least one of a wide area network (WAN) and a local area network (LAN).

8. The system as recited in claim 6, wherein said controllers further comprise connection ports for selectively connecting external electronic devices thereto, wherein upon said connection, an input device is able to selectively control data stored or read by said external electronic devices.

9. The system as recited in claim 8, wherein said external electronic devices includes a DVD player, a CD player, a home theater system, a record player, a digital music player, a minidisk player and a cassette deck.

* * * * *